R. H. HASSLER.
SPRING SUSPENSION FOR VEHICLES.
APPLICATION FILED APR. 26, 1913.
1,130,897.
Patented Mar. 9, 1915.
2 SHEETS—SHEET 1.
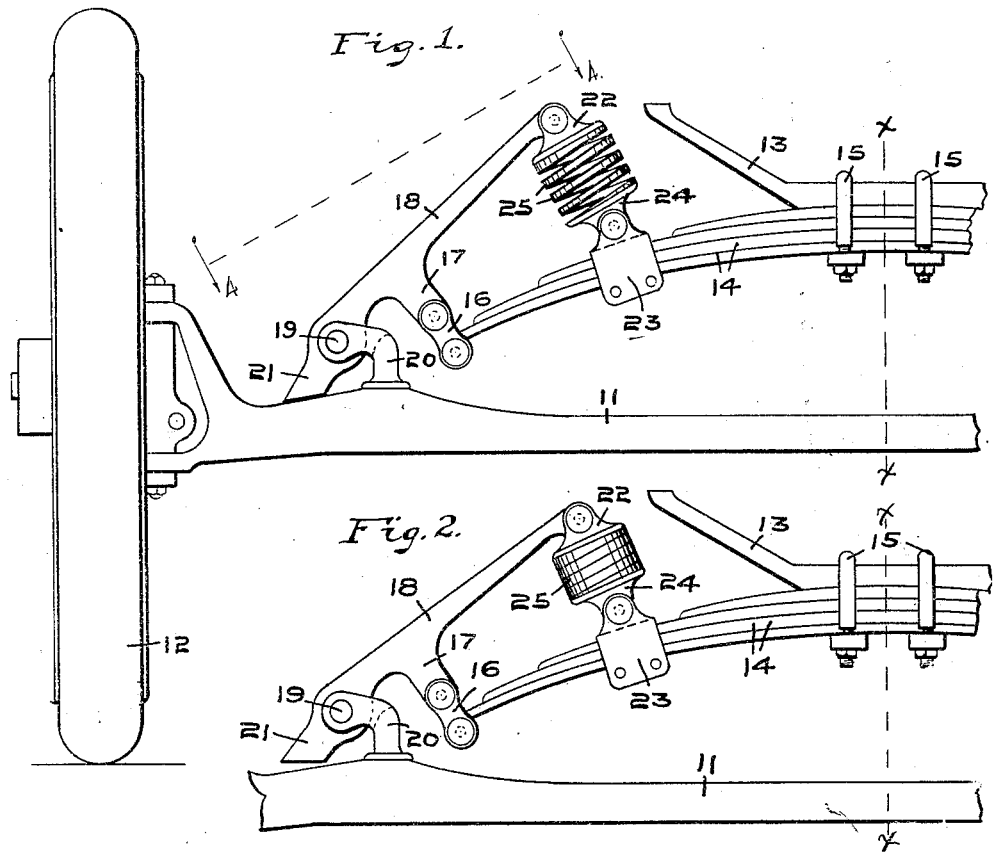
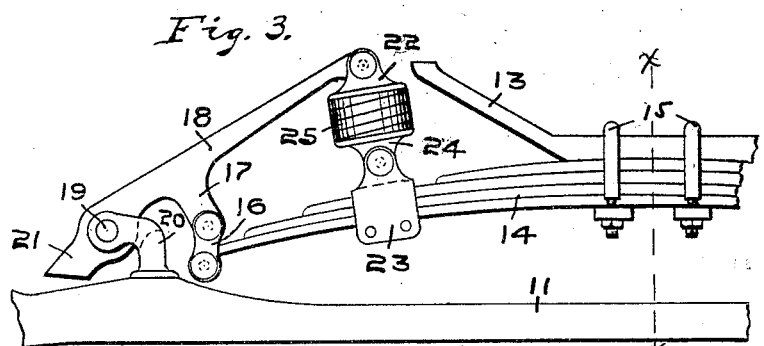

R. H. HASSLER.
SPRING SUSPENSION FOR VEHICLES.
APPLICATION FILED APR. 26, 1913.
1,130,897.
Patented Mar. 9, 1915.
2 SHEETS—SHEET 2.
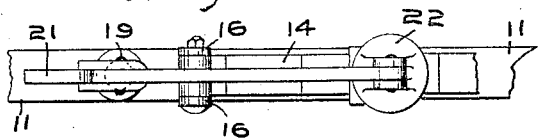
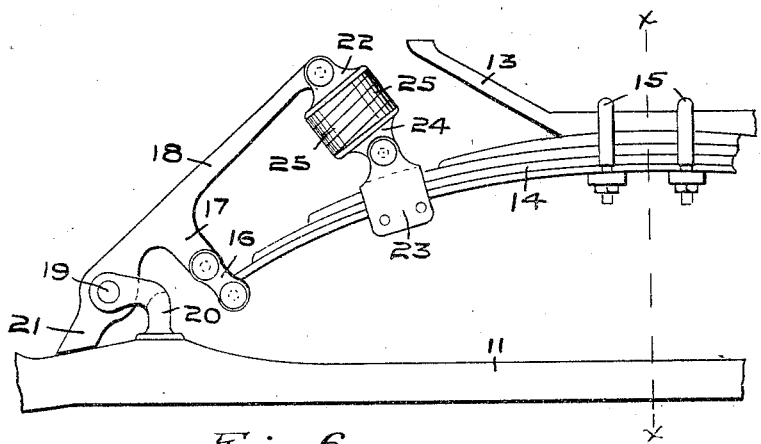
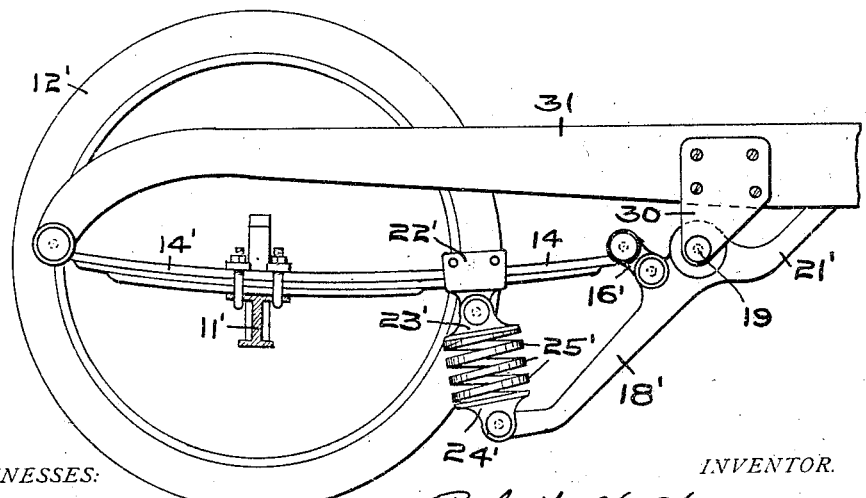
WITNESSES:
INVENTOR.
Robert H. Hassler
BY
Minturn & Woerner
ATTORNEY.

UNITED STATES PATENT OFFICE.

ROBERT H. HASSLER, OF INDIANAPOLIS, INDIANA.

SPRING SUSPENSION FOR VEHICLES.

1,130,897.   Specification of Letters Patent.   Patented Mar. 9, 1915.

Application filed April 26, 1913. Serial No. 763,763.

*To all whom it may concern:*

Be it known that I, ROBERT H. HASSLER, a citizen of the United States, residing at Indianapolis, in the county of Marion and State of Indiana, have invented certain new and useful Improvements in Spring Suspension for Vehicles, of which the following is a specification.

This invention relates to a device or form of spring suspension intended to give easy riding qualities to a vehicle. It accomplishes this object by performing in general, two separate functions. The one function consists in affording an extremely soft or sensitive spring supporting means between the axle and the vehicle body. The other function consists in preventing the rebound or "tossing action" from affecting the body of the vehicle. The one mechanism performs these two separate functions automatically in rapid succession as the road conditions necessitate.

The device is illustrated in the accompanying drawings, in which—

Figure 1 is a partial front view of a vehicle showing a vehicle wheel, the spring suspension in elevation, and part of front axle and vehicle frame. Figs. 2, 3 and 5 are also partial front views of the same parts without the wheel, and intended to show the various actions of the device by illustrating the mechanisms in corresponding positions. Fig. 4 is a plan view of the device as viewed from the dotted line A—A of Fig. 1, and Fig. 6 is an elevation showing a modified form of the device.

In Figs. 1, 2, 3, 4 and 5, like letters of reference refer to like parts.

Referring to these figures, 11 is the vehicle axle, 12 one of the vehicle wheels, 13 the frame or body portion of the vehicle, 14 a leaf or laminated plate spring supporting the frame on the axle. In the particular application shown in these figures the spring 14 is a cross spring, extending transversely of the vehicle axle, and has its center portion rigidly fastened to the frame by the clips 15, 15. The two outer ends of this spring are each fastened to one of my devices,—one of which, that is, one for one side of the vehicle, is shown in the figures. The outer end of the spring 14 is formed in an eye which is pivoted to the lower end of swinging shackles or links 16, 16. The upper ends of these shackles are pivoted to the extension 17 of the lever 18. This lever is pivoted at 19 to a support 20 which is rigidly attached to the axle 11. An arm 21 of the lever 18 extends outwardly and abuts against the axle 11 at certain positions of the device. The lever 18 extends inwardly toward the center of the vehicle and at its inner end is pivotally connected with a spring-seat 22, which seat is free to oscillate about the end of the lever. To the leaf spring 14 is fastened a clamp 23 which is pivotally connected to a spring-seat 24. This seat 24 is free to oscillate somewhat on the clamp 23. Between the seats 22 and 24 is a supplementary compression spring 25, adapted to go to a "solid" or non-yielding form at certain positions of the device.

The actions of the device are as follows: Fig. 1 shows the various parts when the vehicle is running on a smooth road. The compression spring 25 is proportioned with the lever 18 to be more resilient than the leaf spring 14. When the road wheels of the vehicle strike a small obstruction, the spring 25 yields, allowing the lever 18 to tilt slightly, as shown in Fig. 2. Here the leaf spring 14 has been brought nearer to the axle 11 almost solely by the action of the compression spring 25 and the lever 18 and without much or any flexing of the leaf spring itself. This action absorbs the small rapid shocks that would otherwise be transmitted to the frame when the vehicle is driven over rough pavements. This first sensitive action of the parts is obtained, as stated, by the yielding of the compression spring 25,—the tilting of the lever 18 and consequent lowering of the shackle supporting point 17. At this time a slight gap opens between the axle and the arm 21 of the lever 18.

When the road wheels of the vehicle encounter a large obstruction, the sensitive acting parts 25 and 18 are protected from injury by the closing of the spring 25 and the leaf spring 14 then bends in the manner usual with leaf springs. The parts then take the position shown in Fig. 3 in which the frame of the vehicle is brought still nearer to the axle. During this part of the action, the spring 25 does not act except to oscillate and go down bodily. With its two seats 22 and 24 it forms virtually a link, acting with the shackles 16, 16 to support the parts. During this part of the movement, a differential action occurs due to the fact that the downward motion of the leaf spring where the clamp 23 is attached, results in a still further lowering of the extension 17. At this time the lever 18 is tilted farther and the gap between the axle and arm 21 is still further opened.

To sum up the above-described features, the supporting action of the device may be divided into two motions:—first, the initial and sensitive action of the spring 25 to carry light loads easily and absorb the small quick vibrations; and second, the more extended action of the spring 14 to carry heavy loads and to withstand large shocks. In the second part of the motion the action of the leaf spring itself is materially improved by the differential action of the lever 18 and the link formed by 22, 25 and 24. This differential action affords a yielding support at the end of extension 17 for the leaf spring,—this yielding being caused by the flexing of the leaf spring itself at the point where the clamp 23 is attached.

All of the above-described features relate to the downward action of the parts to support the frame on the axle. Immediately after the road wheels of the vehicle have struck a large obstacle or encountered a sharp rise in the road, the springs tend to react in such a manner as to give the frame of the vehicle an unpleasant toss or rebound. My device prevents an excessive amount of this rebound, by taking the position shown in Fig. 5. Here the frame 13 has been thrown upward away from the axle 11, the lever 18 has taken the same position as in Fig. 1 with its arm 21 in contact with the axle 11. Further upward movement of the lever being prevented, the spring 25 compresses and resists the upward motion of the leaf spring 14. When the spring 25 is compressed solid, as shown in Fig. 5, no further upward motion of the clamp 23 is possible. The upward motion of the frame is not stopped suddenly, but gradually. This gradual stoppage is due first to the compression of the spring 25, and secondly, to whatever slight resiliency is left in the leaf spring after the points 21 and 17 become stationary and 25 becomes solid.

In Figs. 1, 2, 3 and 5 the dotted line X—X represents the center of the vehicle. The construction of the device in connection with the cross leaf springs is such that the compression spring 25 is located toward the center of the vehicle and away from the wheel 12. This is an advantage as it serves to protect the spring 25 and the seats 22 and 24 with their pivots from road dirt by locating them in a protected position. The mud thrown by the vehicle tires will not clog the working parts when arranged in this manner.

It will be seen that the lever 18 is extended in a plane at right angles to the vehicle wheel 12, so as to locate the compression spring 25 as far toward the center of the vehicle as possible and away from the wheel. This puts the compression spring with its seats 22 and 24 and their respective pivots in a protected position away from the dirt thrown by the wheels. The lever 18 being placed above the leaf spring also tends to keep the working parts clean and not clogged by road dirt.

Fig. 6 shows a modified form of the device, arranged parallel with the length of the vehicle instead of cross-wise. Here 12' is one of the vehicle wheels, 14' the leaf spring, 11' the axle, 22' the clamp, 16' one of the swinging shackles. This shackle is pivoted at its upper end to one end of the leaf spring and at its lower end to the lever 18'. The lever is pivotally supported by the bracket 30 which is fastened to the vehicle frame 31. Motion of the lever 18' is limited by the arm 21' which strikes the frame 31. The other end of the lever 18' projects in the same direction as the leaf spring and has the spring-seat 24' pivotally connected to it. The spring-seat 23' is pivotally connected to the clamp 22'. The compression spring 25' extends between these two spring-seats 23' and 24'. This form does not obtain the advantage of a protected location of mechanism as afforded by that shown in Figs. 1, 2, 3, 4 and 5.

The difference in construction lies in the fact that the lever is supported by and is also limited by the frame instead of by the axle.

Having thus fully described my said invention, what I claim as new and wish to secure by Letters Patent of the United States, is—

1. In a vehicle, a support, a leaf spring, a lever pivoted to the support, means to limit the play of the lever on the pivot, means connecting the lever to the end of the leaf spring, and a supplementary spring connected at one end to that portion of the vehicle subject to rebound and at the other end to the lever.

2. In a vehicle, a support, a leaf-spring, a lever pivoted to the support, an extension to limit the play of the lever on the pivot by contact with the support, means connecting the lever to the end of the leaf-spring, and a supplementary spring connected with the leaf spring to which the other end of the lever is attached.

3. In a vehicle, an axle, a leaf-spring, a lever pivotally supported from the axle, shackles connecting other portions of the lever with the end of the leaf-spring, and a supplementary spring adapted to become non-yielding at predetermined heavy loads, connecting the end of the lever opposite said pivotal support with the leaf-spring, said lever and auxiliary spring both being on the same side of the leaf-spring.

4. In a vehicle, an axle, a leaf-spring, a lever pivotally supported from the axle, shackles connecting the end of the leaf-spring with the lever intermediate the ends of the latter, a compression spring and a pair of spring seats between which the compression spring is mounted, one of said seats being pivotally secured to an end of said lever and the other seat being pivotally secured to the leaf-spring.

5. In a vehicle, a support, a leaf spring, a lever pivoted to the support, an extension at one end of the lever beyond the pivot to limit the play of the lever on the pivot by contact of the extension with the support, shackles connecting the lever to the end of the leaf spring, and a resilient member between the other end of the lever and other portions of the leaf spring.

6. In a vehicle, a support, a leaf spring, a lever pivoted to the support, an extension at one end of the lever limiting its play on the pivot, shackles connecting the lever to the end of the leaf spring, and a compression spring that becomes non-yieldable connected between the other end of the lever and other portion of the leaf spring.

7. In a vehicle, a support, a leaf spring, a lever pivoted to the support, means for limiting the play of the lever on its support, shackles connecting the leaf spring to the lever, supplementary springs connected between the lever and portions of the leaf spring, the supplementary springs becoming rigid in a plurality of positions of the leaf spring.

In witness whereof, I have hereunto set my hand and seal at Indianapolis, Indiana, this 21st day of April, A. D. one thousand nine hundred and thirteen.

ROBERT H. HASSLER. [L. S.]

Witnesses:
J. A. MINTURN,
F. W. WOERNER.